May 16, 1967 C. H. CHERVENKA 3,319,336
MECHANICAL DIFFERENTIATOR
Filed April 18, 1966 2 Sheets-Sheet 1

CHARLES H. CHERVENKA
INVENTOR.

BY *Robert J. Stewmeyer*

ATTORNEY 3,319,336
MECHANICAL DIFFERENTIATOR
Charles H. Chervenka, Sunnyvale, Calif., assignor to Beckman Instruments, Inc., a corporation of California
Filed Apr. 18, 1966, Ser. No. 543,376
8 Claims. (Cl. 33—27)

This invention relates to apparatus for providing a plot of the slope or differential of a plotted function or data curve.

Mechanical differentiators are known which may be utilized for obtaininig a plotted representation of the derivative of a recorded function or data curve. These devices, however, tend to be costly and complex and are seriously limited with respect to the steepness of the function curve slope which can be handled.

Accordingly, it is a general object of the present invention to provide a mechanical differentiator which is simple, inexpensive to construct, portable and which may be used to quickly obtain a reasonably accurate representation of the derivative of a plotted function or data curve.

Another object of this invention is to provide a mechanical differentiating apparatus which can be used to obtain a plot of the derivative of the function curve having a comparatively steep slope.

A further object of the present invention is to provide a mechanical differentiator in which the sensitivity may be adjusted.

According to one specific, exemplary form of the present invention shown and described herein, there is provided a slope finder which is movable relative to a function or curve plotted on a rectangular coordinate system. As the slope finder is moved relative to the function, it is displaced, manually or automatically, in accordance with the slope of the curve. A follower, connected to the slope finder and restrained to movement in a direction parallel to one of the axes of the coordinate system, is spaced a given distance from the point of slope measurement as measured along the other axis of the coordinate system. The movement of the follower is proportional to the displacement of the slope finder and this movement is therefore a function of the slope or derivative of the function. A recording means is operatively associated with the follower for providing a record of the follower movement. The resulting record is a graphical representation of the differential of the function. The sensitivity of the device may be altered by changing the distance between the follower and the point of slope measurement.

The novel features which are believed to be characteristic of the invention are set forth with particularity in the appended claims. The invention itself however, together with further objects and advantages thereof, can best be understood by reference to the following description taken in connection with the accompanying drawings in which:

Figure 1:
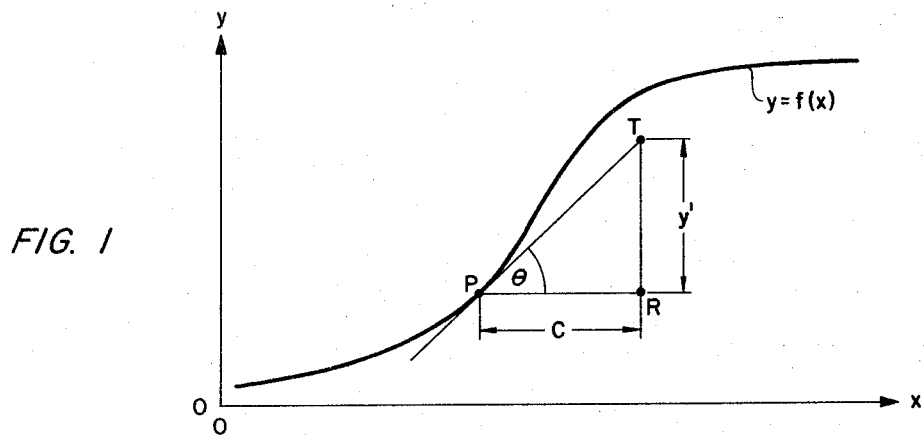
FIG. 1 is a graphical representation of a function $y=f(x)$ and shows the principle of operation of the present invention.
Figure 3:
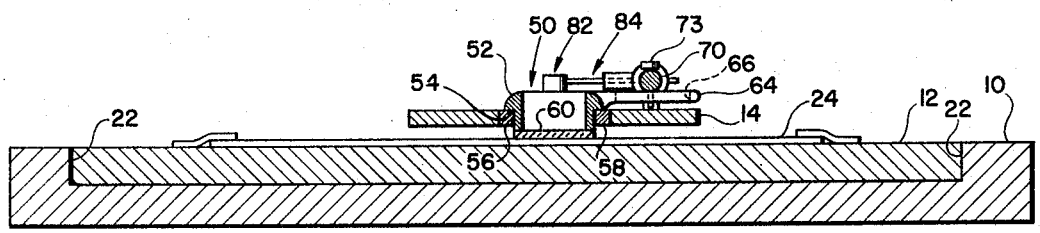
FIG. 3 is an elevation view, in section, taken along the plane 3—3 in FIG. 2.

The principle of operation of the present invention may be understood by referring to FIG. 1 which shows a graphical representation of a function $y=f(x)$ plotted on a rectangular coordinate system having an ordinate or $y$ axis and an abscissa or $x$ axis. $x$ may be any independent variable such as time, distance or other parameter. The value of the derivative at a given point along a function is the rate of change of the function at that point; or, if the function is represented by a curve as in FIG. 1, the value of the derivative at any point is the slope of the curve, that is, the slope of the tangent to the curve at that point. The slope of the curve is positive if the tangent points upward and negative if it points downward, moving to the right. As shown in FIG. 1, the slope at any point P along the curve may be determined by drawing the tangent line PT. The slope of this line is represented by the tangent of the angle $\theta$ which is equal to the ratio $y'/c$. From this relationship it may be seen that $y'=c \tan \theta$. If $c$ is held constant, then the distance $y'$ is a function of the differential of the curve as the tangent line PT is moved along the curve.

Turning now to FIGS. 2–5, there is shown an apparatus for practicing the present invention including generally a base 10, a first carriage 12 and a second carriage 14. These elements may be fabricated of any suitable material. The base 10 is provided with a generally rectangular opening or recess 16, having an upper edge 18, a lower edge 20 and side edges 22. The recess 16 is adapted to receive the first carriage 12 which is also rectangular in shape. The width of carriage 12 is substantially the same as that of the recess 16; its length, however, is considerably smaller than the length of recess 16 thereby permitting the carriage 12 to be slidably moved between the upper and lower edges 18 and 20 of the recess 16 in a direction generally parallel to the side edges 22. A graphical representation of the function $y=f(x)$ is plotted on a sheet 24 carried by the carriage 12. The sheet 24 may be held in place by any suitable means such as pressure sensitive tape applied to the corners. The function is plotted on a rectangular coordinate system having a $y$ axis 26 and an $x$ axis 28, the axis 26, in the embodiment depicted in FIG. 2, being positioned parallel to the direction of movement of the carriage 12 within the recess 16.

Mounted over the base 10 and the carriage 12 is the second carriage 14 which is movable in a direction transverse to that of the first carriage 12, that is, in a direction substantially parallel to the $x$ axis 28. The carriage 14 is advanced by means of a lead screw 30 driven through a speed reduction gear box 32 powered by an electric motor 34. The lead screw imparts motion to the carriage 14 through a pair of follower nuts 35 secured to the carriage near its lower end. A motor speed control 36 may be provided for regulating the motor speed and thereby the traveling speed of the carriage 14. The end of the lead screw opposite the motor 34 is journaled in a bearing unit 38 securely mounted on the base 10.

As an alternative to the lead screw drive, a rack and pinion drive (not shown) may be provided in which the rack is secured to the base adjacent the lower edge 20 of the recess 16. The pinion, which may be driven by a variable speed motor mounted near the lower edge of the carriage 14, engages the stationary rack thereby providing the appropirate driving power for the carriage.

A relatively friction-free support is provided for the upper end of the carriage 14 in the form of a roller 42 rotatably mounted on the carriage 14 for rolling contact with the upper surface of the base 10.

A slope finder 50, displaceable in accordance with the slope of the function at points along the function, is mounted on the carriage 14. The slope finder 50, in a preferred form best shown in FIGS. 2 and 3, comprises a barrel-shaped body 52 having a shoulder 54 and a portion of reduced diameter 56. The portion 56 is received for rotation, about a pivot point P, in a bearing insert 58 securely mounted in the carriage 14. Mounted over the lower extremity of the body 52 is a transparent disk 60 having on its lower surface a scribe mark 62 which, by rotation of the body 52, may be brought into tangency with the function curve $y=f(x)$. The transparent disk 60 is mounted so that its lower surface will be in contact with the sheet 24 thereby minimizing parallax.

Attached to the body 52 and projecting horizontally therefrom, is an arm 64 having formed therein an elongated opening or slot 66. The transparent disk 60 is positioned so that the scribe line 62 is in alignment with the slot 66. Preferably, the line 62 will lie coincident with the longitudinal center line of the slot 66. It will thus be seen that as the carriage 14 is driven across the carriage 12, the operator can, by manual adjustment of the carriage 12 and the slope finder 50, follow the slope of the curve along its entire length.

Also mounted on the carriage 14 is a follower means connected to the slope finder 50 and restrained to movement in a direction transverse to that of the carriage 14, that is, in a direction which is parallel to the $y$ axis 26. The follower means may comprise a rod 70 mounted for sliding movement in a pair of bearings 72 attached to the carriage 14. A depending pin 73, secured to the rod 70, engages the sides of the slot 66.

Figure 4:
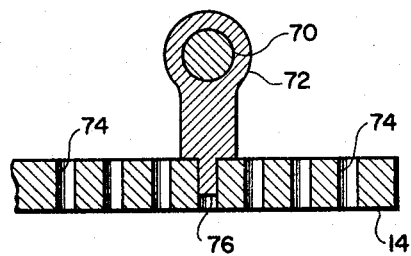
FIG. 4 is an elevation view, in section, taken along the plane 4—4 in FIG. 2.

A distance $c$, as measured along the $x$ axis, separates the pivot point P of the slope finder 50 and the longitudinal center line of the follower rod 70. In order to vary the sensitivity of the apparatus, the distance $c$ is preferably made adjustable by permitting the bearing 72 to be moved closer to, or further away from, the pivot point P. This may be easily accomplished by providing the carriage 14 with two parallel series of holes 74. As best shown in FIG. 4, the bearings 72 may each be provided with a pin 76 adapted to be received by the holes 74. Thus, by raising the follower rod 70 a sufficient distance so that the pins 76 clear the top of the carriage 14, the follower assembly may be moved relative to the point P to vary the sensitivity as desired.

A plot of the derivative $dy/dx$ of the function $y=f(x)$ with respect to $x$ may be made on a sheet 80 taped, or otherwise suitably secured, to the base 10 adjacent the recess 16. The end of the follower rod 70 overlying the sheet 80 is provided with a marking means 82 and a support 84 for securing the marking means 82 to the follower rod 70. The marking means extends through a slot 86 running generally parallel to the rod 70, formed in the upper portion of the carriage 14. The sheet 80 is positioned so that the slot 86 substantially overlies the sheet 80.

Figure 5:
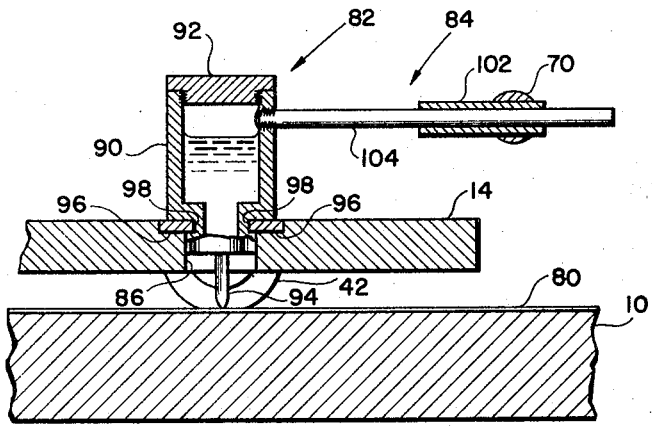
FIG. 5 is an elevation view, in section, taken along the plane 5—5 in FIG. 2.

The marking means 82 may take the form of a pencil, pen, scriber or other suitable tracing means held by the support 84. As best shown in FIG. 5, a marker in the form of an inking head, comprising generally a reservoir 90, a removable cap 92 and a pen 94 biased into yielding engagement with the sheet 80 and in communication with the reservoir 90, may be utilized. To prevent rocking of the inking head as it follows the movement of the rod 70, the head may be mounted on a pair of tracks 96 secured to the carriage 14 and projecting inwardly over the edges of the slot 86. The tracks 96 are received by grooves 98 formed in the sides of the reservoir 90.

To accommodate the transverse adjustment of the follower rod 70 when the sensitivity is changed, the support 84 may be made in the form of a telescoping structure. Thus, a tube 102 may be secured to the rod 70 to project transversely therefrom and a shaft 104, attached to the reservoir 90, is slidably received by the tube 102.

Figure 2:
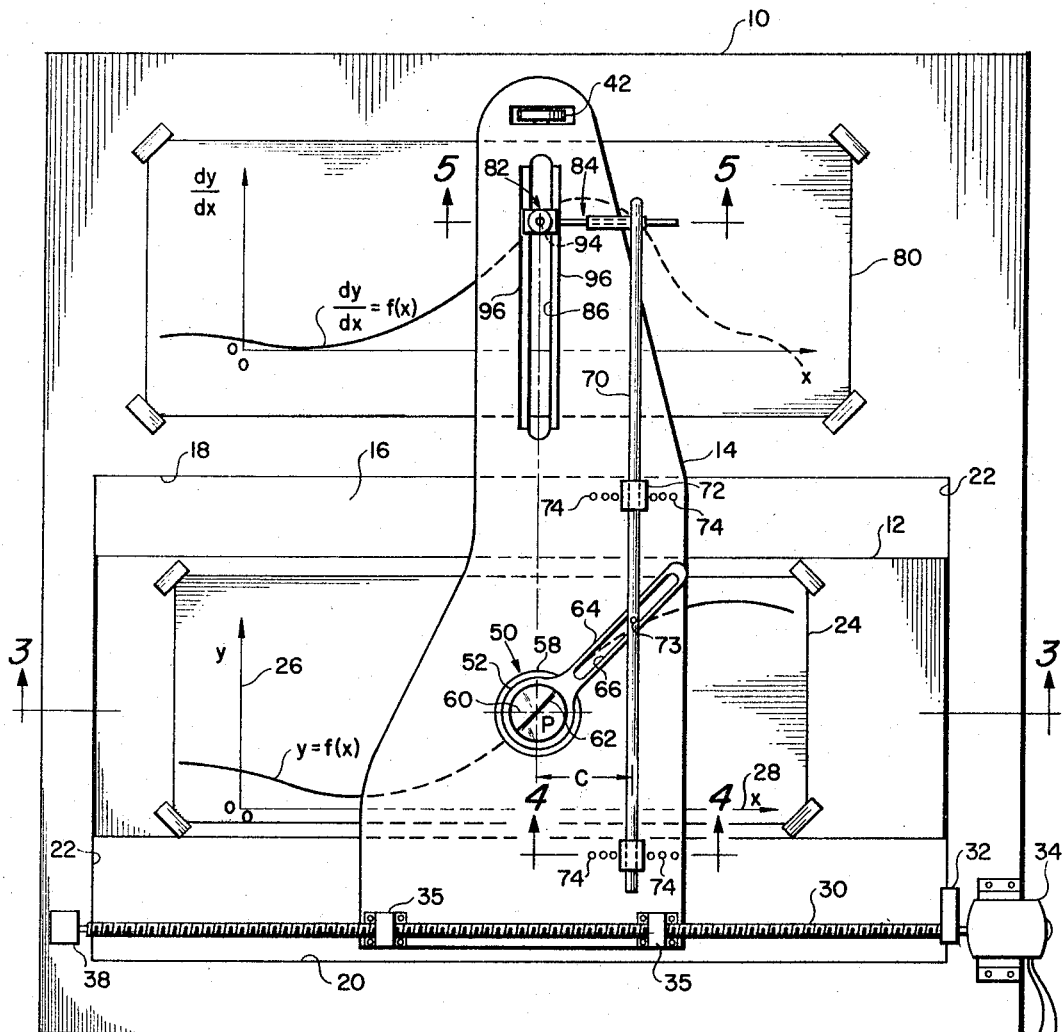
FIG. 2 is a plan view of an apparatus constructed in accordance with the present invention.

As shown in FIG. 2, the marking pen 94 and the pivot point P of the slope finder 50 both lie on a line parallel to the $y$ axis 26. Although this orientation is not essential, it is nevertheless convenient in that the two curves, that is, the function curve and the derivative curve, will "in phase" and after the derivative curve has been traced, the two curves may be quickly compared while the sheets 24 and 80 are still in place on the apparatus.

In the operation of the device, the motor 34 is energized to move the carriage 14 to one extremity of the function curve. The motor is then reversed and the plotting of the derivative begun. The operator manipulates the carriage 12 with one hand and the slope finder 50 with the other. With the scribe line 62 maintained tangent to the function curve $y=f(x)$ at all times, the movement of the follower rod 70, which is a function of the derivative of the curve, is plotted on sheet 80. For increased sensitivity, the bearings 72 are moved, before starting the derivative plot, to holes 74 more remote from the pivot point P.

It will be seen that the lead screw 30 functions also as a pivot for the carriage 14 allowing the upper end of the carriage to be lifted away from the base. This permits the attachment and removal of the sheets 24 and 80 and comparative studies of the curves to be made after the derivative has been plotted.

A mechanical differentiator constructed in accordance with the present invention is capable of providing derivatives of function plots having comparatively steep slopes, both positive and negative. Essentially, the only physical limits in this respect are imposed by the lengths of the slotted arm 64 and the slot 86. The dimensions of the other elements of the device may be determined accordingly. In any event, irrespective of the dimensions chosen, steeper slopes may be handled by decreasing the sensitivity, that is, by moving the follower rod 70 closer to the pivot point P.

It will be obvious to those skilled in the art that various modifications may be made to the specific, exemplary embodiments of the invention described. Thus, operation of the apparatus may be made completely automatic by providing an electric motor drive for the carriage 12 and utilizing photoelectric curve following devices for measuring the slope and controlling motor speed. While particular embodiment have been discussed, it will be understood that the invention is not limited thereto and that it is contemplated to cover in the appended claims any such modifications as fall within the true spirit and scope of the invention.

What is claimed is:

1. An apparatus for obtaining a continuous plot of the differential of a function $y=f(x)$ plotted on a rectangular coordinate system having a $y$ axis and an $x$ axis, comprising
    a base;
    a first carriage mounted on said base for supporting a plot of said function and being movable in a direction parallel to said $y$ axis;
    a second carriage mounted on said base and movable over said first carriage in a direction parallel to said $x$ axis;
    a slope finder, pivotally mounted on said second carriage and angularly positionable to be brought into alignment with lines tangent to said plotted function;
    a follower connected to said slope finder and slidably mounted on said second carriage for movement in a direction parallel to said $y$ axis and positioned a fixed distance from the pivot point of said slope finder as measured along a line parallel to said $x$ axis; and
    means operatively associated with said follower for providing a record of said derivative.

2. An apparatus, as defined in claim 1, in which
    said distance between said follower and said slope finder pivot point is adjustable whereby the sensitivity of said apparatus may be varied.

3. An apparatus, as defined in claim 2, which includes a motor for driving said second carriage; and in which said slope finder and said first carriage are manually positionable.

4. An apparatus, as defined in claim 3, in which said slope finder comprises a rotatable transparent disk mounted on said second carriage and provided with a scribe line which, by rotation of said disk, is angularly positionable tangent to said plotted function;

said follower comprises a rod slidably supported in bearings adjustably mounted on said carriage; and said means for providing a record of said differential includes a marking means positioned at a point lying on a line parallel to said $y$ axis and passing through said pivot point.

5. In an apparatus for providing a continuous plot of the differential of a function plotted on a rectangular coordinate chart having a pair of axes and mounted on a base, the combination comprising means for moving said chart on said base along one of said axes;

a slope finder movable on said base relative to said chart along the other of said axes, said finder comprising a device having a straight line, said device being pivotally mounted for rotation about a point passing through said line, and an arm radially projecting from said device along said line extended, whereby said device may be rotated to a position tangent to each point of said plotted function and said arm is caused to assume a radial position corresponding to said tangent;

a follower connected to said slope finder arm and restrained to movement in a direction parallel to the one of said axes, said follower being spaced a fixed distance, as measured along the other of said axes, from the pivotal point of said device, the movement of said follower being proportional to the radial displacement of said arm; and recording means operatively associated with said follower for providing a record of said follower movement.

6. A combination, as defined in claim 5, in which said fixed distance between said follower and said pivotal point of said device is adjustable to provide variations in the sensitivity of said apparatus.

7. A combination, as defined in claim 6, in which said recording means comprising a recording stylus connected to said follower by a telescoping support member, and a guide for constraining said stylus to move in a line passing through said pivotal point of said device and parallel to the one of said axes.

8. A combination as defined in claim 7 in which said slope finder is automatically moved parallel to the other of said axes, and the movement of said chart relative to said slope finder is manually coordinated in order that said slope finder follow along said plotted function.

References Cited by the Examiner

UNITED STATES PATENTS

| 1,380,754 | 6/1921 | Van Bogaert | 33—27 |
| 1,907,873 | 5/1933 | Richards et al. | 33—1 |

FOREIGN PATENTS

| 272,704 | 4/1914 | Germany. |
| 118,616 | 11/1955 | Russia. |

LEONARD FORMAN, *Primary Examiner.*

H. N. HAROIAN, *Assistant Examiner.*